T. S. HARRIS.
COMBINED TRACTOR AND GANG PLOW.
APPLICATION FILED OCT. 3, 1916. RENEWED APR. 4, 1919.

1,305,099.

Patented May 27, 1919.
3 SHEETS—SHEET 1.

WITNESSES

INVENTOR
T. S. Harris
BY
ATTORNEYS

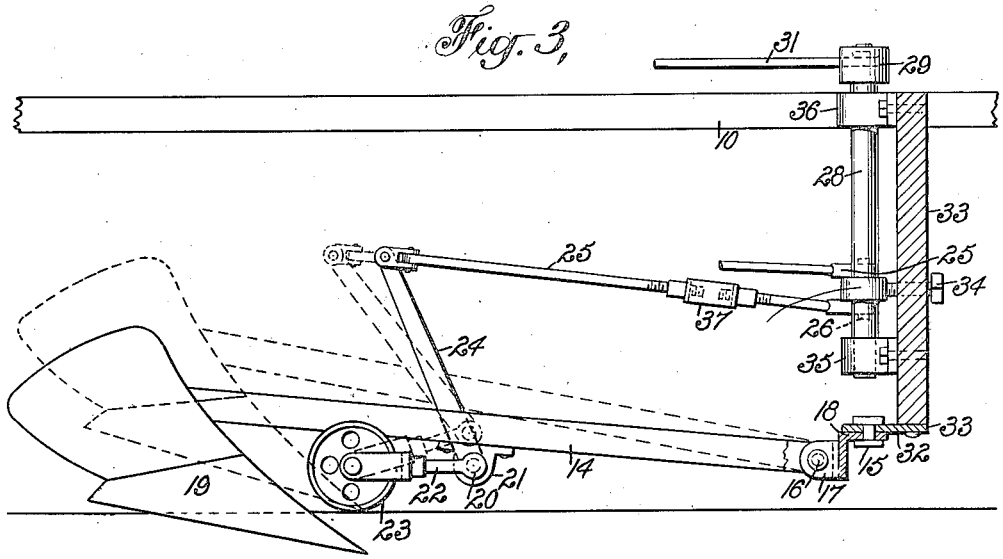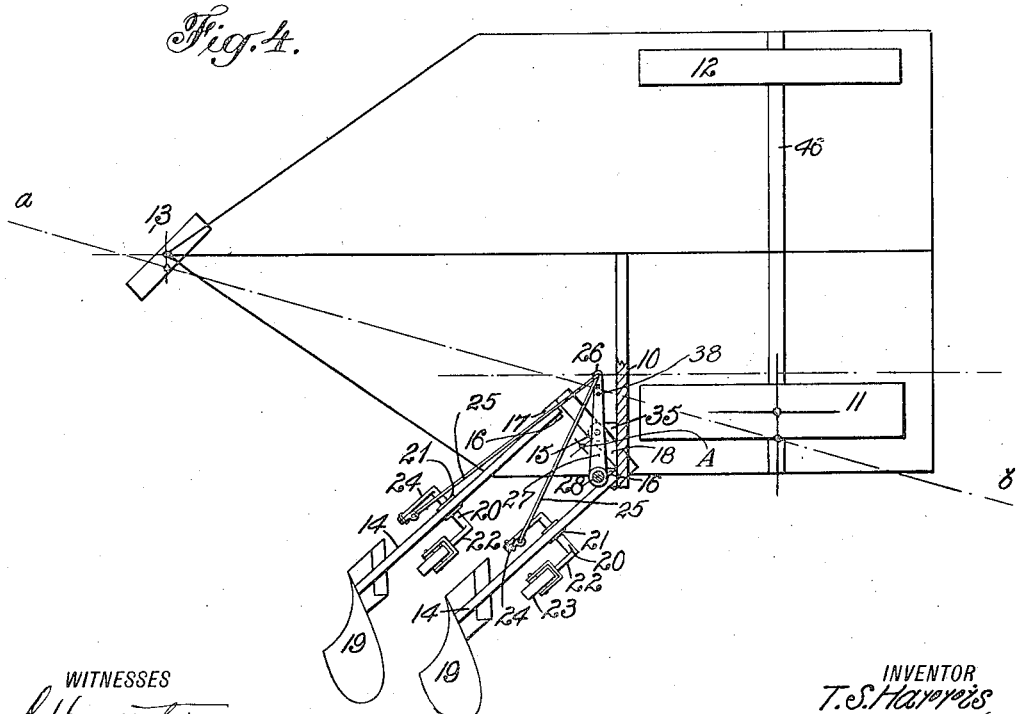

T. S. HARRIS.
COMBINED TRACTOR AND GANG PLOW.
APPLICATION FILED OCT. 3, 1916. RENEWED APR. 4, 1919.
1,305,099.
Patented May 27, 1919.
3 SHEETS—SHEET 3.
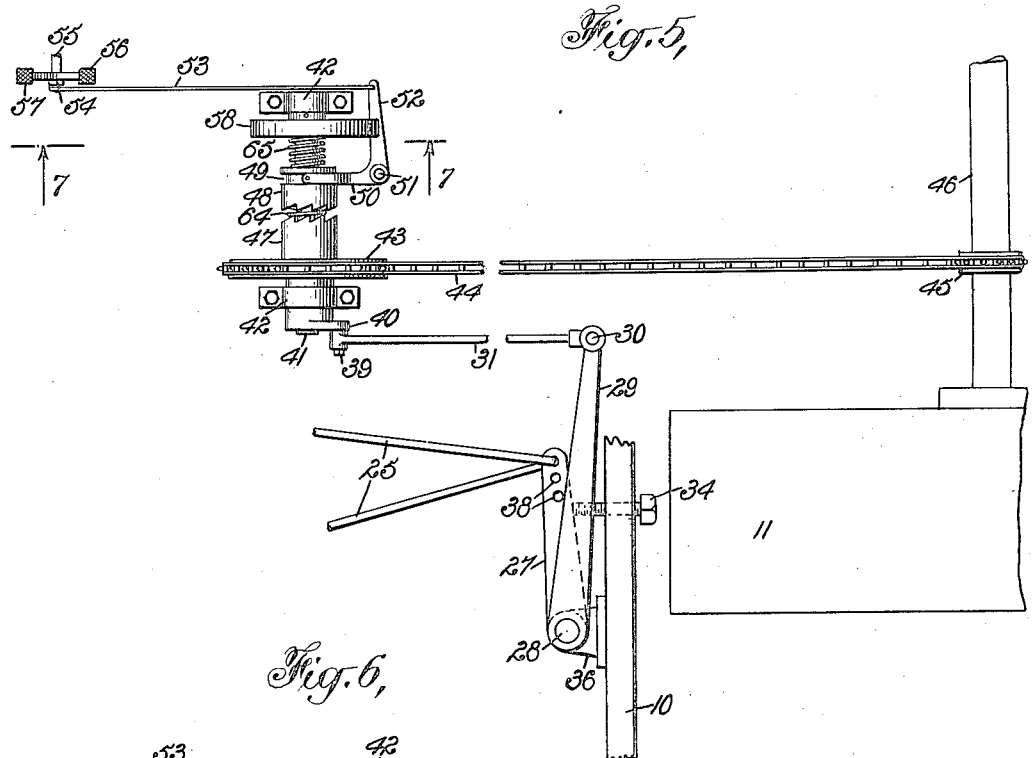
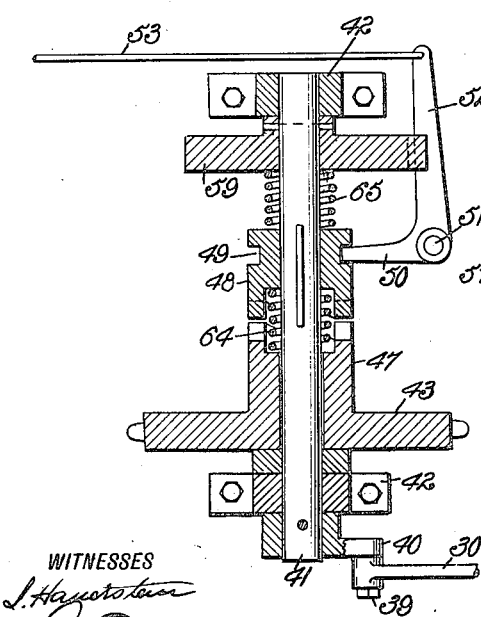
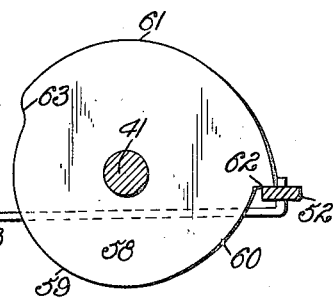
WITNESSES
INVENTOR
T. S. Harris
BY
ATTORNEYS

UNITED STATES PATENT OFFICE.

THADDEUS SIDNEY HARRIS, OF WAVERLY, ILLINOIS.

COMBINED TRACTOR AND GANG-PLOW.

1,305,099.	Specification of Letters Patent.	Patented May 27, 1919.

Application filed October 3, 1916, Serial No. 123,470. Renewed April 4, 1919. Serial No. 287,614.

*To all whom it may concern:*

Be it known that I, THADDEUS S. HARRIS, a citizen of the United States, and a resident of Waverly, in the county of Morgan and State of Illinois, have invented a new and Improved Combined Tractor and Gang-Plow, of which the following is a full, clear, and exact description.

My invention relates more particularly to a three-wheel, single drive, tractor and plow. As is well known, these implements have a tendency to cant and tip over when making a sharp turn to the right with the plows in the ground. This tendency makes it impossible to plow close to the ends of the field and then make sharp turns to the right. The tendency to cant and tip over is due to the sidewise pull of the plows on the tractor frame in turning a sharp corner.

The prime object of the present invention is to provide a plow lift, associated with a power-operated actuating means therefor, so constructed and arranged as to counter-act and overcome the tendency of the tractor to cant and tip over.

The invention also has for an object to provide a novel power-actuated plow lift arranged to be manually brought into action and automatically thrown out of action when the plows are lifted.

A further and important object is to provide a plow lift that will serve to create a re-action on the tractor which assists in rotating the tractor about a vertical axis and against the side pull of the plows when turning to the right with the plows only partially raised from the ground.

The nature of the invention and the manner in which it functions to prevent tipping over will appear as the description proceeds.

Reference is to be had to the accompanying drawings forming a part of this specification in which similar reference characters indicate corresponding parts in all the views.

Fig. 3 is a longitudinal vertical section on the line 3—3, Fig. 1;

Fig. 4 is a plan view with parts in section, the view being mainly diagrammatic and being given to indicate the relative positions of the tractor frame and plows when turning to the right;

Fig. 5 is a plan view of the power-actuated plow lifting means;

Fig. 6 is a detail sectional plan view thereof;

Fig. 7 is a detail in vertical section on the line 7—7, Fig. 5.

Figure 1:
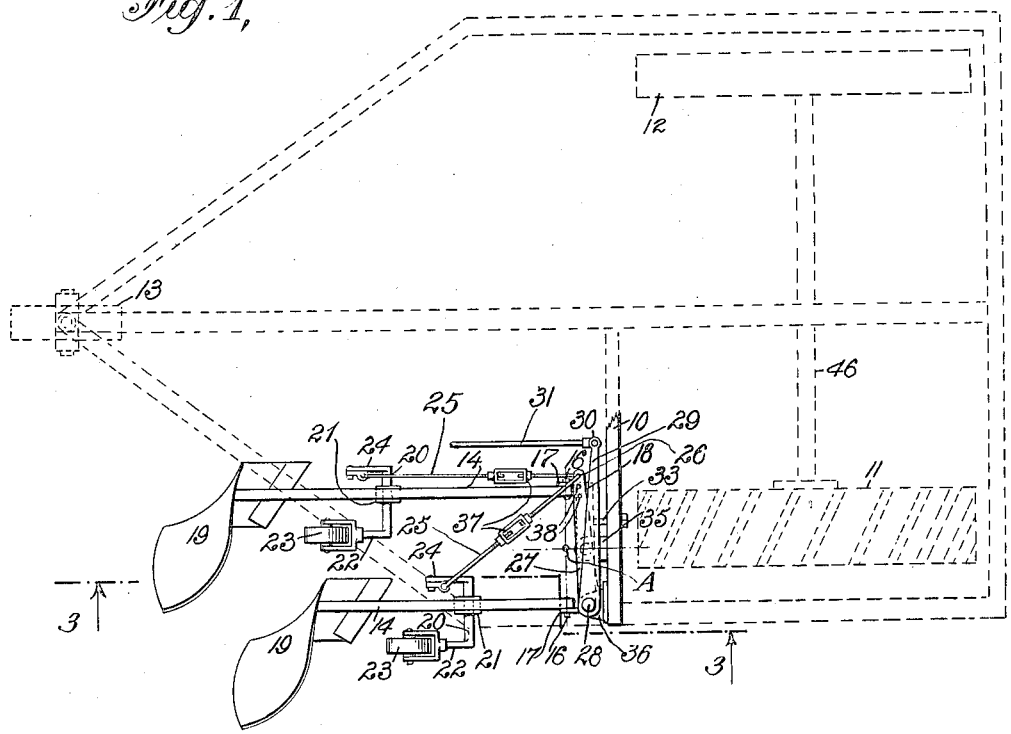
Figure 1 is a plan view of my attachment, the tractor and its frame being indicated mainly by dotted lines, parts of the attachment being omitted.
Figure 2:
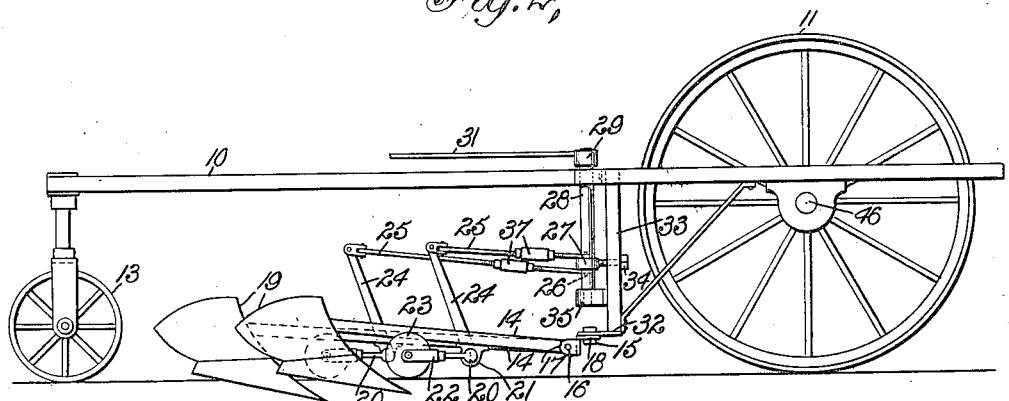
Fig. 2 is a side elevation with the tractor frame and wheels in full lines.

The numeral 10 indicates the frame of the tractor which may be of any approved form. The numeral 11 indicates the drive-wheel which is at the front of the frame at the right, there being an idler running wheel 12 at the opposite side of the frame and usually co-axial with the drive-wheel, and a steering wheel 13, all of which features are common to the type of tractor plow to which the invention relates, it being immaterial whether the steering wheel precedes or follows the drive wheel.

In my invention a suitable number of plow beams 14 are provided having individual horizontal pivots 16 and a common vertical pivot 15, positioned to the right of directly behind the center of the drive wheel 11, that is to say, the vertical pivot, in regard to its location from right to left, is slightly to the right of an imaginary horizontal line which is extended backward from the center of the drive wheel 11. The pivot bolts 16 in the illustrated example, extend through the individual beams 14 and through rearwardly projecting ears 17 on a transverse plow frame or bar 18 which receives the vertical pivot 15. Each plow beam carries a suitable plowshare 19.

On each plow beam at approximately its longitudinal center, is rotatively mounted a short horizontal shaft 20 turning in a bearing 21. On the right hand end of each shaft 20 is a fixed arm 22 which extends rearwardly from the shaft and carries a suitable plow support here shown as in the form of a wheel 23. On the opposite end of each shaft 20 is a fixed upwardly extending lever arm 24. To each lever arm 24 is pivotally secured the rear end of a connecting rod 25, the forward ends of the rods being pivotally connected as at 26 with an arm 27 on a vertical shaft 28 provided with suitable means whereby the shaft 28 may be turned. In the illustrated example a lateral arm 29 on the shaft at the top is adapted for connection with actuating means for turning the shaft through an angle, there being shown a connecting rod 31, connected at one end with the arm 29 as at 30 and actuated in the manner hereinafter described.

Any suitable means may be provided on the tractor frame to receive the vertical pivot 15; as shown, a vertical depending post 33 on the frame 10 has a foot 32 through which said pivot 15 passes. The numeral 34 indicates a suitable stop in the post 33 to limit the forward movement of the arm 27. The numerals 35 and 36 indicate bearings in which the vertical shaft 28 turns.

It is to be observed that the vertical shaft 28 is adjacent to the common vertical center 15 of the plows. The proximity of the shaft 28 and the pivotal center 15 permits the plows to swing relatively to the tractor frame.

It will be obvious that if the vertical shaft 28 is so turned as to swing the arm 27 rearwardly, the rods 25 and lever arms 24 will cause the shafts 20 to be rocked rearwardly, thereby depressing the wheels 23 or equivalent supports, and thus lifting the heel of the plow, the plow beam swinging vertically on its pivot 16.

To actuate the connecting rod 31, the end opposite the arm 29 is connected by a wrist pin 39 with a crank arm 40, the hub of which is fixed on a transverse shaft 41 turning in bearings 42, which, in practice, are suitably bolted to any convenient part of the tractor frame 10. Loose on the shaft 41 is a sprocket wheel 43 over which a chain 44 runs, said chain running also over a drive sprocket 45 on the main axle 46 of the tractor.

The hub of the sprocket 43 is formed with a clutch element 47 constituting the loose element of the clutch, there being a fixed clutch element 48 slidable on the shaft 41 but keyed to turn therewith. The clutch element 48 has a groove 49 receiving the fork 50 of a clutch lever, said clutch lever having a bellcrank form and fulcrumed at its angle at 51 on any convenient member of the tractor frame. The other arm 52 of the clutch lever is connected with the forward end of a connecting rod 53, the rear end of the connecting rod being pivoted to the lower end of a treadle 54 which is generally of Y-shape, pivotally mounted as at 55 and having a front pedal 56 and a rear pedal 57 to rock the treadle in opposite directions.

Fixed on the shaft 41 to turn therewith is a cam designated generally by the numeral 58 and adapted to automatically trip the arm 52 of the clutch lever. Said cam has a concentric surface 59 extending for somewhat less than half the periphery, and a cam surface 60 at one end of the concentric surface 59 and merging therewith, the said surfaces 59, 60 together extending for somewhat more than half the periphery, and a cam surface 61 at the opposite side of the wheel, there being an abrupt shoulder 62 at the juncture of the cam surfaces 60, 61, while at the opposite side of the wheel the cam surface 61 merges gradually as at 63 into the concentric surface 59.

With the described construction a downward pressure on the forward pedal 56 will move the connecting rod 53 rearwardly and so rock the clutch lever as to shift the clutch element 48 into engagement with the loose element 47 which is continually driven from the main axle, the shaft 41 will thereby be caused to turn in a manner to give a turning movement to the crank arm 40 and thereby, through the connecting rod 31, drawing lever arm 29 of vertical shaft 28 to the rear. This rotates the shaft 28 contra-clockwise and communicates a rearward thrust to connecting rods 25 and lever arms 24. The plows are thereby raised from the ground. When the crank arm 40 has completed one-half a revolution, the movements of all the parts are reversed and the plow would again descend, but, when the half-way point or dead center is just passed, the movement of shaft 41 and crank arm 40 is stopped by the shoulder 62 of cam 58 striking the arm 50 of the clutch lever, which lever has no movement in a vertical plane. Previous to this, the arm 50 of the clutch lever is thrown in a direction slightly away from the shaft 41 by the cam surface 60, thereby disengaging the clutch and allowing the sprocket to continue its movement.

It will be evident that the driver may thus manually throw the power lift into action and then may give his entire attention to the turning of the tractor, relying on the plow lift being automatically thrown out of action. To lower the plows manually a reverse movement is given to the treadle 54 by a pressure on the rear pedal 57, thus giving a forward movement to the connecting rod 53 and disengaging the arm 52 of the clutch lever from the shoulder 62, and allowing crank arm 41 to continue its rotating and allowing the plows to descend under the influence of gravity.

To center the fork 50 of the clutch lever in the neutral position, a spring 64 is coiled on the shaft 41 between the clutch elements, 47, 48, and a counter-acting spring 65 is coiled about said shaft at the opposite sides of the clutch element 48.

In the operation of the plow lift there are four influences set up tending to counter-act the tipping over tendency. (1) The decreased depth of the plows more or less decreases the draft thereof so that the tipping over tendency is lessened; (2) the increased downward pull of the plow acting on the shaft 20 as a fulcrum communicates a lifting influence to the tractor frame where the plow beam attaches, that is to say, at the vertical pivot 15. As the vertical pivot 15, in regard to its location from right to left, is slightly to the right of an imaginary horizontal line which is extended backward from the center of the drive wheel 11, and the vertical shaft 28 is correspondingly placed to the right, the mean point A which is midway between the horizontal pivots 16, is the point at which the combined re-action lift of the different plow beams is communicated to the tractor, and this point A is considerably to the right of the line $a-b$ which joins the right edges of the drive wheel 11 and rear wheel 13, so that the combined lifting influence on the tractor frame tends to right the latter against tipping tendency. (3) The downward pressure of the plow beam on the shaft 20 causes a forward pressure to be communicated to the rod 25, since the gage wheel 23 is rearward of the shaft 20 and thus, a down pull on the beam is forward of the said wheel 23. This forward pressure of the rod 25 thus tends to right the tractor frame in setting up a force acting in a direction intersecting the downwardly acting tipping force so that the resultant force is a modification of the tipping force.

(4) A further influence arises due to the downward pressure of the plow on shaft 20 because, the wheel or equivalent support 23 being to the right of the plow beam, tends to create a torque or torsion in each plow beam; the combined torsional effect on the different plow beams is communicated to the tractor frame through the individual horizontal pivots 16 and the common vertical pivot 15, the result tending to counter-act the tipping over tendency of the tractor.

Also, a forward thrust of the connecting rods 25 when the lift is operated is at all times in a line that passes to one side of a vertical pivot; therefore, this thrust tends to help in moving the rear end of the tractor, to rotate it about a vertical pivot passing through the drive wheel and helps to neutralize the sidewise pull of the plows, just as this same forward thrust helps to prevent canting.

It will be seen that the plow-lifting force may be varied by varying the distance of the point of connection 26 beyond a vertical line passing through the pivot 15, for which purpose the arm 27 is preferably provided with a series of vertical holes 38 either of which may receive the pivot pin 26. Thus, whatever adjustment that will be necessary to prevent the tractor from tipping may be made. The length of the rods 25 may be varied by providing each rod with a turnbuckle 37 or equivalent adjusting means.

It is to be understood that the described plow lift is not limited in use to the type of tractor mentioned but may be used to advantage on other tractors and plows.

Having thus described my invention, I claim as new, and desire to secure by Letters Patent:

1. In a plowing machine, the combination with a tractor, of means for preventing canting of the tractor when turning, comprising an element carried by the tractor and pivoted thereon by a vertical pivot, plows carried by said element and pivoted thereto by horizontal pivots, a fulcrum wheel mounted to swing at one side and just below each of the plow beams, a crank arm in operative engagement with said wheel, a horizontal connecting rod pivoted at its rear end to said crank arm, a lever pivoted to the tractor frame at one end and to the connecting rod at the other end at a point adjacent the vertical pivot attaching the said element to the tractor, a vertical shaft connected with said lever to swing the same, and an actuating lever for said shaft in operative engagement with the tractor mechanism, so that upon operating the actuating lever the connecting rod will actuate the fulcrum wheel to lift the plows and said plows thus lifted reacting on the tractor frame to correct the tendency to cant.

2. In a combined tractor and plow, a tractor, a plow attached to the tractor by a vertical pivot, and means for communicating lifting power from the tractor to the plow in such a manner that the re-action from the lifting power tends to rotate the tractor about a vertical pivot which passes through the drive wheel.

3. In a combined tractor and plow, a tractor, a plow attached to the tractor by a vertical pivot, and means for communicating power from the tractor to the plow to exert both a lifting force on the plow and a re-action on the tractor in a manner to give a turning movement to the rear end of the tractor.

4. In a tractor plow, a tractor, a plow frame attached at its front end to the tractor frame by a vertical pivot, plows attached to said plow frame by individual horizontal pivots, means mounted upon each plow beam, whereby it may be raised and lowered, an arm mounted on the tractor frame adjacent to the vertical pivot of the plow frame, means to turn said arm, and a connection between the said arm and the said means on the plow beams to operate said means.

5. In a tractor plow, a tractor, a plow having the front end thereof connected with the tractor frame by a vertical pivot adjacent to a side of the frame, a transverse shaft rockably mounted on the plow beam between the ends thereof, a rearwardly extending arm on the said shaft, outward from the plow beam, a plow-supporting element on said arm at the rear end, a fixed upwardly extending lever arm on the shaft at the inner side of the plow beam, a lateral arm mounted on the tractor frame to turn on a vertical axis adjacent to the pivot of the plow, and a connecting rod connecting the lever arm on the shaft with the lateral arm on the tractor frame.

6. A tractor plow including a plurality of plows, a plow frame to which the plows are connected by individual horizontal pivots, said plow frame being connected with the tractor frame by a vertical pivot, individual plow lift means on each plow beam, means to actuate the plow lift, means to rock the plows vertically on their horizontal pivots to partially lift the plows, and means to drive said actuating means from a revoluble element of the tractor.

THADDEUS SIDNEY HARRIS.